United States Patent
Mundo et al.

(10) Patent No.: US 6,385,557 B1
(45) Date of Patent: May 7, 2002

(54) TRACKING THE REMAINING USEFUL LIFE OF A MAGNETIC DATA STORAGE TAPE

(75) Inventors: James D Mundo; David M Rhodes, both of Loveland; John J Szlendak; David H Rosenberg, both of Fort Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/392,199

(22) Filed: Sep. 8, 1999

(51) Int. Cl.[7] .............................................. G06F 17/40
(52) U.S. Cl. ........................ 702/179; 702/187; 702/182
(58) Field of Search ........................ 360/69, 74.6, 132, 360/48; 377/18; 702/187

(56) References Cited

U.S. PATENT DOCUMENTS

| | | | |
|---|---|---|---|
| 5,081,548 A | * 1/1992 | Inazawa et al. ............ 360/72.2 |
| 5,576,903 A | * 11/1996 | Brown et al. .................. 360/48 |
| 6,166,882 A | * 10/1998 | Solhjell ....................... 360/132 |
| 6,298,414 B1 | * 10/2001 | Yoshida ....................... 711/111 |

* cited by examiner

Primary Examiner—John S. Hilten
Assistant Examiner—Douglas N Washburn

(57) ABSTRACT

A method for tracking the remaining useful life of a magnetic data storage tape. The tape is checked to determine if it is formatted so that an indication of the cumulative number of end-to-end passes performed on the tape can be maintained on the tape. The indication of the number of passes is initialized if the tape has not been previously written, and is maintained to reflect the number of end-to-end passes that have been performed on the tape. That information is then ultimately transferred to the user in a descriptive form that indicates the amount of use incurred by the tape with respect to the recommended useful life of the tape, as recommended by the tape manufacturer in terms of the total number of end-to-end passes performed on the tape.

21 Claims, 4 Drawing Sheets

| BYTES | DESCRIPTION | |
|---|---|---|
| 0-7 | QIC FORMAT DOCUMENT NUMBER | |
| 8-15 | FORMATTER MANUFACTURER | |
| 16-31 | FORMATTER LOCATION | |
| 32-43 | FORMATTER DRIVE SERIAL NUMBER | |
| 44-51 | FORMATTER DRIVE FIRMWARE REVISION NUMBER | |
| 52-59 | CARTRIDGE VENDOR | |
| 60-75 | CARTRIDGE TYPE | ← 110 |
| 76-107 | CARTRIDGE SERIAL NUMBER | |
| 108-113 | DATE | |
| 114-117 | TIME | |
| 118-127 | PAD | |
| 128-129 | TRACK NUMBER | ← 100 |
| 130-131 | CARTRIDGE DATA ZONE LENGTH (IN FEET) | |
| 132-133 | LAST DATA TRACK NUMBER | |
| 134-135 | MAXIMUM TAPE SPEED (IN INCHES PER SECOND) | |
| 136-255 | ZERO FILL | |
| 256-257 | END-TO-END PASS COUNT VALIDATOR | |
| 258-259 | END-TO-END PASS COUNT | |
| 260-511 | RESERVED | |

FIG. 4

TRACKING THE REMAINING USEFUL LIFE OF A MAGNETIC DATA STORAGE TAPE

FIELD OF THE INVENTION

The present invention relates, in general, to magnetic tape data storage devices and, more particularly, to tracking the remaining useful life of a magnetic data storage tape.

BACKGROUND OF THE INVENTION

Magnetic tape data storage devices, or "tape drives," have long been key devices in computer systems for storing digital data in nonvolatile form. In many systems, tape drives have become important secondary data storage devices for the purposes of redundant data storage (or "backup") and retrieval (or "restore"). Magnetic tape has been recognized by computer users as a cost-effective medium for redundantly backing up data already present on other primary nonvolatile data storage devices, such as magnetic disk drives. That stored data is then available to be restored to another primary storage device in the case that the disk drive becomes inoperative. Furthermore, in order to restore data that is relatively pertinent and up-to-date, the backup operation is usually performed frequently enough to allow restoring of data that is not significantly out-of-date compared to the data on the disk drive.

Often, a relatively small set of magnetic tape cartridges is used in rotation to backup the disk drive at sufficient intervals since data from very old backup operations is usually of little use. As a result, each of the magnetic tapes may be recorded, or "written," many times, and the data on the tape may be retrieved, or "read," as a part of the restore process, or to verify the validity of data just written to the tape.

Magnetic tapes used for backup purposes must be extremely reliable if they are to be used as insurance against a failure of the primary data storage device. However, after a tape has been used many times during backup operations, it can become increasingly difficult for the data to be retrieved without encountering permanent data errors due to the amount of wear incurred by the tape. The passing of the tape over and through various mechanical portions of the drive (such as the read-write head and tape rollers) causes the tape to wear. The degree of wear of a tape is, therefore, most directly dependent on how much the tape has been read and written. Since tapes used for data backup are often written a multitude of times and are thus susceptible to the problems associated with excessive wear, a method of determining and reporting when a tape has reached its useful life becomes valuable in helping prevent the use of a tape for data backup when the tape is worn to the point where retrieval of data may become problematic.

In some magnetic tape implementations, the amount of wear incurred by the tape is ascertained by the tape drive keeping track of the frequency and severity of read errors encountered during tape read operations. Once the frequency or severity of read errors surpasses a predetermined threshold, the user is informed in some way that the tape has exceeded its useful life, and should be replaced. Similar methods of error tracking are also used in magnetic hard disk drives and optical disk drives. Such a method requires rather extensive record-keeping and analysis on the part of the tape drive to determine if the tape has experienced sufficient wear to be replaced.

An alternative method that requires little analysis on the part of the tape drive is to compare the cumulative use of the tape to the tape manufacturer's recommended usage specifications. For example, manufacturers of QIC (quarter-inch-cartridge) TRAVAN tape minicartridges generally specify a maximum of approximately 10,000 end-to-end tape passes for their products, where each end-to-end pass is a read or write operation that traverses the entire length of the tape. Tape drives that write to and read from TRAVAN minicartridges employ a longitudinal recording method, whereby data is written in data "tracks" that extend lengthwise along the tape. Thus, the reading or writing of an entire track constitutes an end-to-end pass of the tape.

One such standardized implementation of this method is integrated in a status-reporting mechanism called TAPEALERT, which is well-known in the art and has been modified for use with TRAVAN magnetic tape minicartridge drives, which are used primarily for data backup and restore of personal computers. Among other functions, such as reporting current drive operational status, TAPEALERT provides an indication of the useful life of the tape currently loaded in the drive. TRAVAN tape minicartridges employ a "write pass count" field as part of the control information found on the tape. The write pass count indicates the number of complete write operations that have been performed on the tape. Once the value in that data field reaches a certain predefined numerical limit, the tape drive in which the tape is loaded informs the computer connected to the drive that the tape has reached the end of its useful life, and must be replaced.

Due to the limitations on the types of information provided by the TRAVAN standard data format, data wear is estimated by using the number of complete write operations as reported in the control information on the tape. Unfortunately, this number does not necessarily correlate with the amount of wear the tape has endured. For example, a backup operation can easily consist of a write operation of several tracks, with each track requiring one pass of the tape over the reading mechanism. Such a use of the tape will be identified as a single write operation by TAPEALERT. In some implementations of TAPEALERT, the predefined numerical limit is set to compensate for such a possibility, assuming that a typical data backup operation utilizes, for example, about 80 percent of the tape. However, a more accurate way to more closely track the use of a tape would be advantageous.

Additionally, TAPEALERT provides a single type of warning, indicating that the tape has reached the end of its useful life, and should be replaced immediately. Ideally, it would be desirable if one or more early warnings could be given to the user, indicating that the tape was approaching, but had not necessarily exceeded, its useful life.

Accordingly, a need exists for a method that more closely monitors the amount of useful life remaining in a magnetic data storage tape and reports that useful life to the user in a more descriptive fashion.

SUMMARY OF THE INVENTION

In a possible embodiment, the invention provides the user with a timely, accurate assessment of the useful life remaining on a magnetic data storage tape. The actual usage of the tape is tracked closely in terms of end-to-end passes performed on the tape. This data is then used to inform the user when the tape is nearing or has surpassed its recommended life. Such an embodiment is easily implementable in the tape drive firmware and the software of the computer connected to the tape drive while providing valuable information concerning the remaining useful life of the tape to the user.

Briefly and in general terms, a method of tracking the useful life remaining on a magnetic data storage tape according to an example embodiment of the invention is begun by establishing the ability of the tape to store a data field indicating [that] the total number of end-to-end passes in some form. By example, this task can be implemented by the drive checking for a special identification field on the tape which indicates that the tape has been "formatted" for use by the invention. ("Formatting" is the process of writing certain control information on the tape to allow the writing and reading of user information by a tape drive.) If no valid indication exists, the method of determining the useful life of the tape cannot be utilized on that cartridge, and the user can be notified of this fact. Otherwise, the data field can be initialized with a starting value indicating that no end-to-end passes have been performed if that data field has not been previously written.

Assuming the tape is formatted and initialized for use with the proposed method, the drive is then responsible for maintaining an indication of the number of end-to-end passes on the tape to reflect the use of the tape by the drive. In an example embodiment, the form of that value can be the total number of end-to-end read and write passes, or just the number of end-to-end write passes, with a read pass assumed as a verification for each write pass. In such an embodiment, the value is maintained by adding to the value the number of write (or read and write) passes that have been performed on the tape since the value on the tape was last written, and storing that value back on the tape. The drive then passes to the computer that information, either in its original form, or in a "quantized" form, whereby the information is placed in a descriptive category, such as "useful life exceeded," or "nearing recommended useful life." That information, indicating the usage level status of the tape, is then transferred to the attached computer for the user.

Other aspects and advantages of the invention will become apparent from the following detailed description, taken in conjunction with the accompanying drawings, illustrating by way of example the principles of the invention. Also, the claims alone, and not the preceding summary or the following detailed description, define the present invention.

BRIEF DESCRIPTION OF THE DRAWINGS

FIG. 4 is a table displaying the contents of the version of the track ID block, which is found within the second media header block of the media header frame of FIG. 3.

DETAILED DESCRIPTION OF THE INVENTION

A method of tracking the remaining useful life of a magnetic data storage tape according to the invention utilizes the number of end-to-end passes performed on the tape as a basis for tracking tape usage. Using a form of this valve as an indication of the cumulative level of usage the tape has incurred provides the user with a notion of the amount of useful life remaining in the tape before reaching its recommended usage limit as stated by the tape manufacturer.

In a typical situation, the tape will be loaded in a tape drive for the purposes of reading and writing the tape. The tape drive will also be connected to a computer, with that computer being either a standalone system or connected to a computer network. The tape drive is thus available to back up data from or restore data to the computer to which it is connected, as well as any system on a network that may be attached to the computer. The computer, in turn, is running a computer application capable of understanding the information it receives from the drive regarding the usage level of the tape, and of relaying that information to the user.

Figure 1:
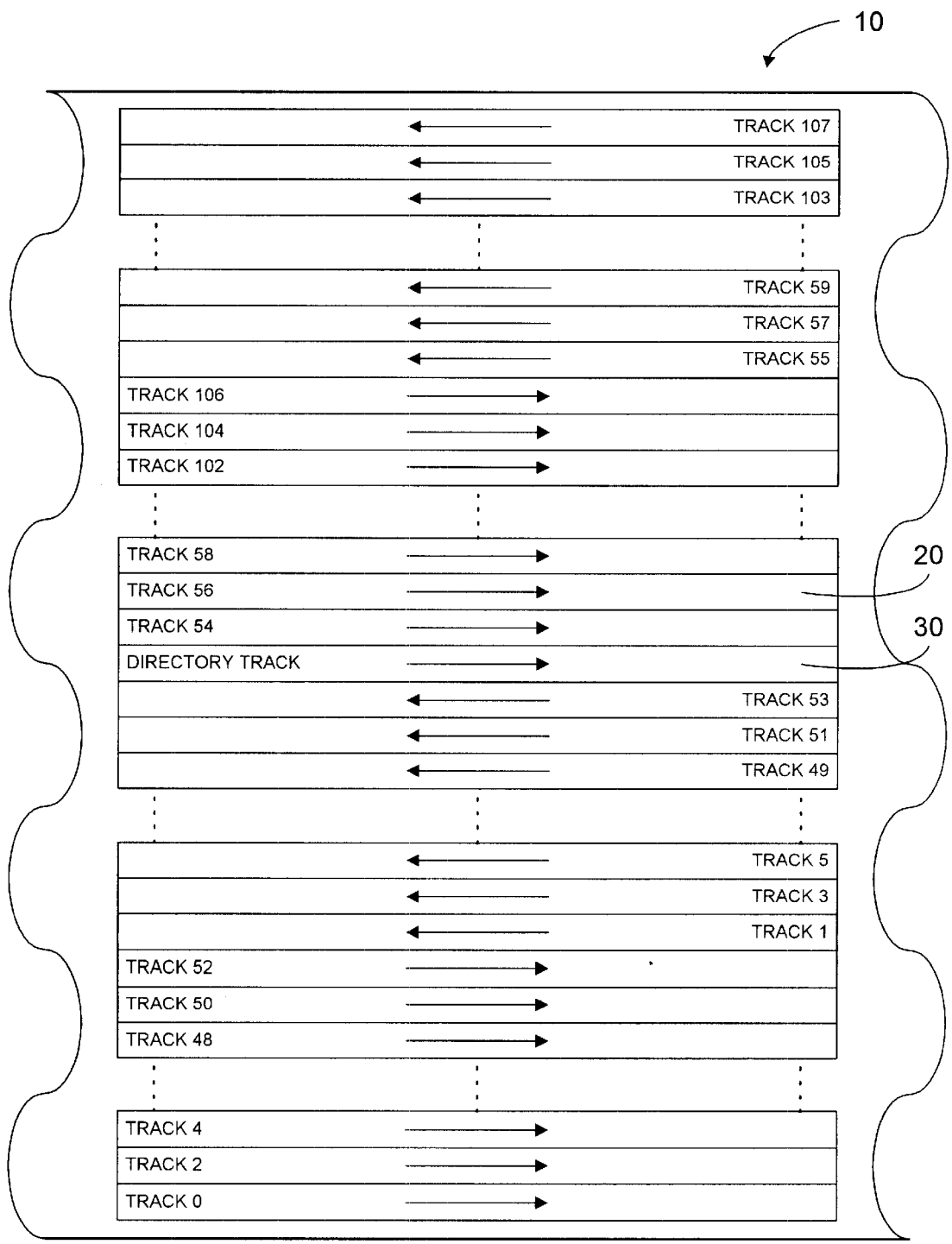
FIG. 1 is a block diagram of the track layout of a TRAVAN tape used in an example embodiment of the invention.

In a representative embodiment, the tape cartridge is a QIC-180 TRAVAN minicartridge, and the drive is a device designed to write to and read from such a minicartridge. As shown in FIG. 1, a tape 10 of a TRAVAN minicartridge holds a multitude of user tracks 20 and one directory track 30 that run the length of the tape. The arrows in FIG. 1 indicate the direction in which each track is written. The write (or read) of a single track results in one pass of the tape. Since each user track 20 is written in ascending numerical order, it can be seen that each track is written in the opposite direction from the previous and succeeding track. This circumstance allows a write operation arriving at the end of a track to continue to the next track almost immediately without having to rewind the entire tape. As a result, a write operation of a certain number of tracks results in that same number of passes being performed on the tape.

Figure 2:
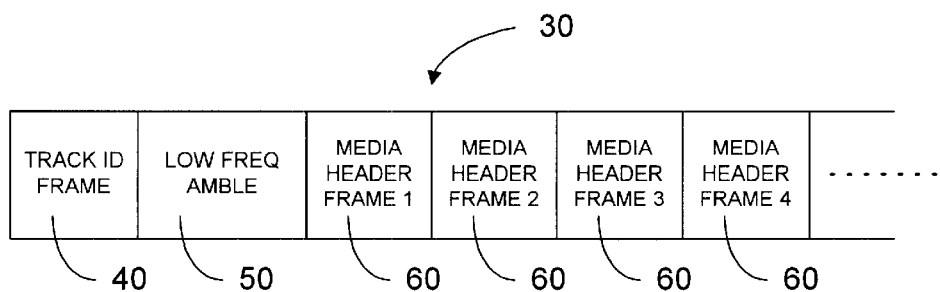
FIG. 2 is a block diagram of the directory track on a TRAVAN tape.

An example embodiment of the invention is centered around the use of directory track 30, which is written at the conclusion of every write operation on the tape. As displayed in FIG. 2, directory track 30 contains a track ID frame 40 for track identification, followed by a low frequency amble 50 for the benefit of the drive's reading circuitry, followed by one or more media header frames 60. Each media header frame 60 contains the same information, including volume directory information so that specific user data may be located on the tape.

Figure 3:
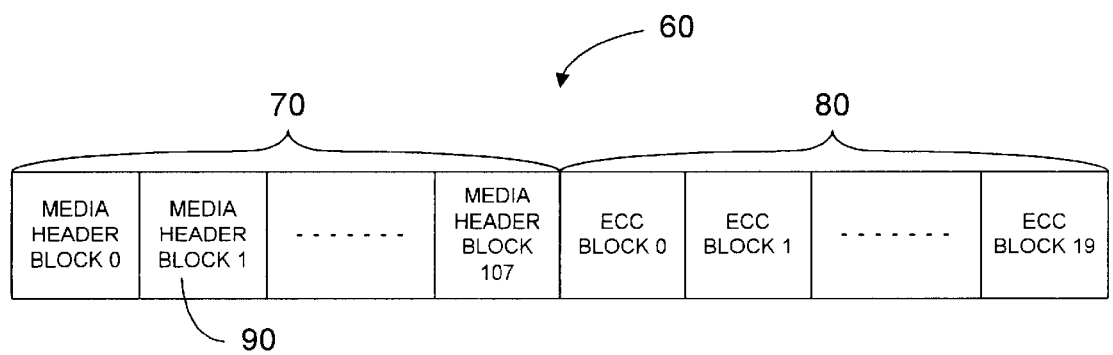
FIG. 3 is a block diagram of a media header frame, which is part of the TRAVAN tape directory track shown in FIG. 2.

As shown in FIG. 3, each media header frame 60, in turn, consists of a group of 108 media header blocks 70, followed by a group of 20 error correction code (ECC) blocks 80 that are used to correct errors in the media header blocks. Second media header block 90 (denoted as 'MEDIA HEADER BLOCK 1' on the diagram) holds the information necessary to carry out the invention.

In some cases, the tape is "preformatted," or formatted by a machine dedicated for that purpose prior to the sale of the tape to the user. In other circumstances, the drive could also be capable of formatting the tape. Formatting of the tape includes the writing of directory track 30, as well as other data structures on the tape.

A more detailed look at the data in second media header block 90 is shown in FIG. 4. Second media header block 90 is essentially a copy of the track ID block, which is found in the track ID header for every track on the tape. This block provides information identifying, among other things, track number 100 and cartridge type 110. A large vendor-unique data area 120 is also included, which is utilized by the invention to record an indication of the number of end-to-end passes performed on the tape. More specifically, 2 bytes at the start of vendor-unique data area 120 are used as a pass count validator 130, and 2 more bytes are used as a pass count 140 which indicates the number of end-to-end passes made on the tape. Vendor-unique data area 120 is used in this capacity because the standard portions of second media header block 90 do not include any fields which allow the tracking of the number of end-to-end passes on the tape.

Figure 5:
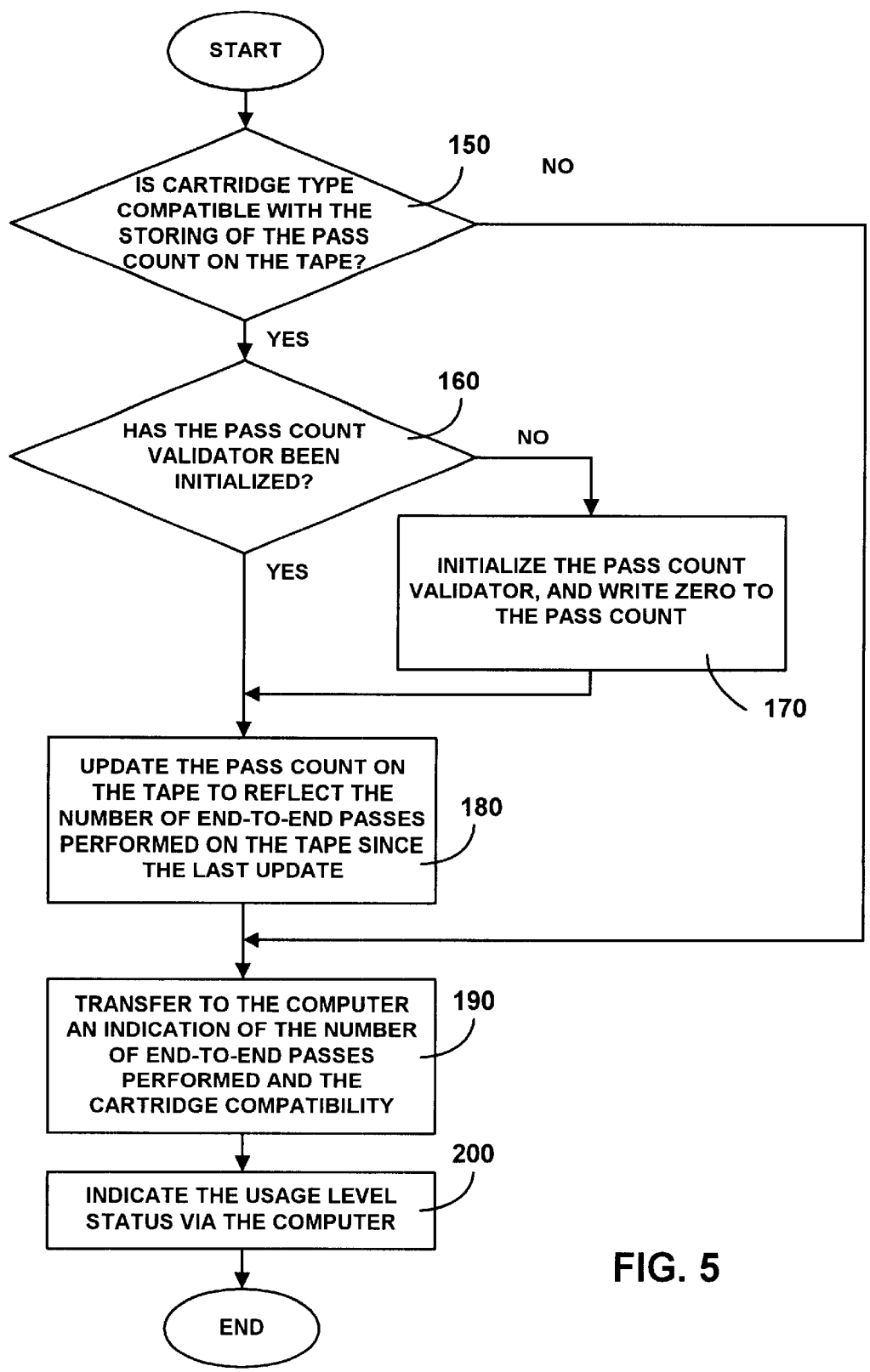
FIG. 5 is a flow chart depicting the steps concerning the tracking and reporting of the tape usage level in an example embodiment involving the use of a TRAVAN tape minicartridge.

A possible embodiment of the invention concerning the use of a TRAVAN minicartridge is shown by way of a flow chart in FIG. 5. In this embodiment, cartridge type 110 (of FIG. 4) is used by the drive as a tape identification to determine if pass count 140 (of FIG. 4) is reserved on this tape for use by the invention (step 150). If the drive recognizes the contents of cartridge type 110, which is made up of a short field of ASCII characters in an example embodiment, the drive will be aware of all of the capabilities of that particular cartridge, including the tracking of the end-to-end passes performed on the tape. If the drive does not recognize that data field, the tape drive may not allow writing and reading of that particular cartridge, or may allow writing and reading at some reduced level of functionality, but will not attempt to update the portion of vendor-unique area 120 normally reserved for pass count 140. Instead, an indication that the tape is not compatible with the storing of pass count 140 will ultimately be sent to the computer (step 190). In this case, the computer application will use the indication of cartridge compatibility to inform the user that the usage level of the tape currently in the drive cannot be monitored (step 200).

Referring again to FIG. 5, after verifying cartridge type 110 (of FIG. 4), the drive then checks if pass count validator 130 (of FIG. 4), which is a two-letter ASCII field in a possible embodiment, has been initialized (step 160). From FIG. 4, if pass count validator 130 has been written with a predetermined pattern expected by the drive, the drive then assumes that the value in pass count 140 is valid. If pass count validator 130 does not match the predetermined pattern, the drive will write the predetermined pattern to pass count validator 130 and write zero to pass count 140 to properly initialize the counter on the tape, as shown in step 170 of FIG. 5.

Thereafter, the drive is responsible for maintaining a proper value of pass count 140 (of FIG. 4) to reflect any further usage of the tape if the tape has been formatted for such a purpose. To do this, according to a possible embodiment, the drive will update pass count 140 to reflect the number of end-to-end passes performed on the tape since the last time pass count 140 was updated, as noted in step 180 of FIG. 5. One way of performing this task is to keep track of the number of times a track change occurs while performing a write operation. Additionally, this number can also be increased by one at the end of a write operation to account for the last track written during a backup. This number generated by the drive is then added to pass count 140, and the resulting sum is written to pass count 140 after a write termination command has been issued to the drive by the computer. In this embodiment, pass count 140, by indicating only the number of write passes performed, represents only half of the end-to-end passes actually performed, assuming that a read operation immediately following the write operation was executed to verify the data just backed up. Performing such a verification after a write operation is the default mode of operation in a representative embodiment. In another embodiment, both read and write end-to-end pass operations may be reflected by pass count 140.

During the time the tape is resident in the drive, the computer may request from the drive an indication of the current usage level of the tape. In an example embodiment, an indication of the value from pass count 140 and an indication of the value of cartridge type 110 (checked in step 150 of FIG. 5) are transferred to the computer, as shown in step 190 of FIG. 5. In that case, it is then the responsibility of the computer application to use those values to indicate to the user the relative usage level of the tape in comparison to the recommended usage level of the tape cartridge (step 200 of FIG. 5). For example, for a minicartridge with a recommended useful life of 10,000 end-to-end tape passes, a value of 10,000 in pass count 140, where the drive counts both read and write tape passes, would indicate that the tape has reached the end of its recommended useful life. Such an indication could then be given by the computer so that the user would be aware that the tape should be replaced. In an alternative embodiment, whereby only end-to-end write passes are tracked, a value of 5,000 in pass count 140 would cause the computer application to inform the user that the tape has reached the end of its useful life, assuming each write operation were followed by a read verification pass.

In order to provide more warning for the user, the computer application may also inform the user during step 200 when a predetermined threshold less than the recommended useful life of the tape has been attained. For example, in a possible embodiment, where the recommended useful life for a tape is 10,000 end-to-end passes, the application may specifically indicate when the number of passes has exceeded 9,000 but not yet reached 10,000, thereby informing the user that the tape has not yet exceeded its useful life, but that its end of life is approaching. In yet another embodiment, the computer application may indicate any of a multiple number of thresholds which the usage level of the tape has exceeded in order to give the user a more precise indication of the number of end-to-end passes that have been performed on the tape. For example, the computer application may provide different indications to the user for usage levels of greater than 100% of the recommended useful life, between 90% and 100%, between 80% and 90%, and less than 80%.

In another embodiment relating to step 190, the value read from pass count 140 on the tape is modified by the drive to a quantized version before being transferred to the computer. For example, instead of passing the number of end-to-end passes from the tape directly to the computer, the drive may instead transfer a more general indicator of the usage of the tape, such as "useful life exceeded", "90% of useful life exceeded," "less than 90% of useful life exceeded," or "tape not formatted to indicate tape usage." In this case, the computer application would just indicate one of these states directly in step 200 of FIG. 5, instead of converting from the number of end-to-end passes and the indication of the type of cartridge to one of these states.

From the foregoing it will be apparent that the invention provides a simple and effective method for informing the user of the usage level of the tape. Although several embodiments of the invention have been explained, the invention is not to be limited to the specific forms so described and illustrated. The invention is limited only by the claims.

What is claimed is:

1. A method for tracking tape usage of a formatted magnetic data storage tape, the tape being used by a tape read-write device, the tape having a predetermined recommended useful life defined in terms of the number of end-to-end passes performed on the tape, the method comprising:

establishing the ability of the tape to store a first number indicating the total number of end-to-end passes performed on the tape; and maintaining the first number to reflect the use of the tape.

2. The method of claim 1, wherein the tape read-write device is connected to a computer running a computer application capable of indicating the relative usage level of the tape, the method further comprising the steps of:

comparing the first number to the recommended useful life; and thereafter indicating the relative usage level of the tape via the computer application.

3. The method of claim 1 wherein:

the establishing step comprises checking a tape identification data field to determine if the tape has been formatted to allow storing of the first number; and the method further comprises initializing the first number if the first number has not yet been written with a valid value.

4. The method of claim 1 wherein the maintaining step comprises the further substeps of:

reading the first number from the tape;

adding to the first number a number of passes performed on the tape since the last time the first number was written to the tape, thereby generating a new number indicating the total number of end-to-end passes performed on the tape; and writing the new number to the tape as the first number.

5. The method of claim 1 wherein the first number indicating the total number of end-to-end passes is the total number of end-to-end write passes performed on the tape.

6. The method of claim 1 wherein the first number indicating the total number of end-to-end passes is the total number of end-to-end read and write passes performed on the tape.

7. The method of claim 1, wherein the tape read-write device is connected to a computer running a computer application capable of indicating the relative usage level of the tape, the method further comprising the steps of:

transferring from the device to the computer a general indicator of the total number of end-to-end passes performed on the tape; wherein the general indicator is a quantized version of the first number; and thereafter indicating the relative usage level of the tape, directly from the general indicator, and via the computer application.

8. The method of claim 7 wherein the general indicator indicates one of at least three separate states.

9. The method of claim 8 wherein one of the separate states indicates that the recommended useful life of the tape has been exceeded.

10. The method of claim 8 wherein at least one of the separate states indicates that a usage level less than the recommended useful life of the tape has been attained.

11. The method of claim 1, wherein the tape is a QIC TRAVAN minicartridge, and the first number is written to the media header frames of the tape.

12. A method for tracking the remaining useful life of a magnetic data storage tape, comprising:

storing on the tape a pass count indicating a number of end-to-end passes performed on the tape; and updating the pass count during use of the tape.

13. A method as in claim 12, further comprising:

comparing the pass count to a recommended useful life for the tape; and indicating to a user the remaining useful life of the tape.

14. A method as in claim 13, further comprising determining said recommended useful life from a cartridge type value stored on said tape.

15. A method as in claim 13, wherein a computer application running on a computer performs said comparing and indicating steps, and wherein a tape drive holding the tape performs said updating step.

16. A method as in claim 13, wherein a computer application running on a computer performs said indicating step, and wherein a tape drive holding the tape performs said updating and comparing steps.

17. A method as in claim 13, wherein said indicating step is triggered by a number of usage level thresholds.

18. A method as in claim 17, wherein at least one of said number of usage level thresholds is a number of end-to-end passes less than said recommended useful life.

19. A method as in claim 17, wherein one of said number of usage level thresholds is said recommended useful life.

20. A magnetic data storage tape, comprising:

a multitude of user tracks and one directory track that run the length of the tape; and a pass count stored on said directory track, said pass count indicating a number of end-to-end passes performed on the tape.

21. A magnetic data storage tape as in claim 17, further comprising a pass count validator stored on said directory track.

* * * * *